March 22, 1938.    S. S. MASSEY    2,111,983
WHEEL ARRANGEMENT FOR STREAMLINE VEHICLES
Filed March 11, 1936

INVENTOR:
STANLEY S. MASSEY.
BY
ATTORNEYS.

Patented Mar. 22, 1938

2,111,983

UNITED STATES PATENT OFFICE 2,111,983

WHEEL ARRANGEMENT FOR STREAMLINE VEHICLES

Stanley S. Massey, Alameda, Calif.

Application March 11, 1936, Serial No. 68,288

2 Claims. (Cl. 280—87)

This invention relates to improvements in vehicles, and has particular reference to the wheel arrangement of a streamline vehicle.

A further object is to produce a vehicle wherein is incorporated a means for changing the center of gravity from the longitudinal center line of said vehicle to either the right side or the left side of the vehicle as desired.

Therefore, by shifting these wheels to either side of the longitudinal center line of the vehicle the center of gravity of the entire vehicle is shifted to the side opposite that in which the wheels are shifted, and as a result the vehicle leans into the curve instead of having the customary tendency of going off at a tangent of the curve.

A still further object of the invention is to produce a vehicle wherein the power may be applied to a single front or rear wheel or to both front and rear wheels, and also to provide means to steer the vehicle through the pivotal action of the front or rear wheel and both front and rear wheels.

A further object is to produce a vehicle which will tip in the proper direction in rounding a curve to offset the customary tendency of a car to roll over in a direction opposite to that of the curve due to the centrifugal action of the vehicle.

A further object is to produce a vehicle which will have a greater visibility and one which will be safer to drive as a consequence.

Other objects and advantages will be apparent during the course of the following description.

In the accompanying drawing forming a part of this specification and in which like numerals are employed to designate like parts throughout the same, Fig. 1 is a side elevation of my vehicle;

In rounding a turn in a vehicle having the customary four wheel arrangement, the vehicle tends to roll over toward the outside of the curve which causes skidding and results in many serious accidents.

I have, therefore, devised a car having a wheel arrangement wherein a single wheel is mounted at each end of the vehicle and in alignment with each other, this alignment being in the plane of the vertical longitudinal medial line of the vehicle, and to employ a pair of spaced stabilizer wheels adjacent the outer margin of the vehicle. While in the present instance I have shown no particular mounting for all of these wheels, it is obvious that the springs may be applied wherever necessary.

Figure 1:
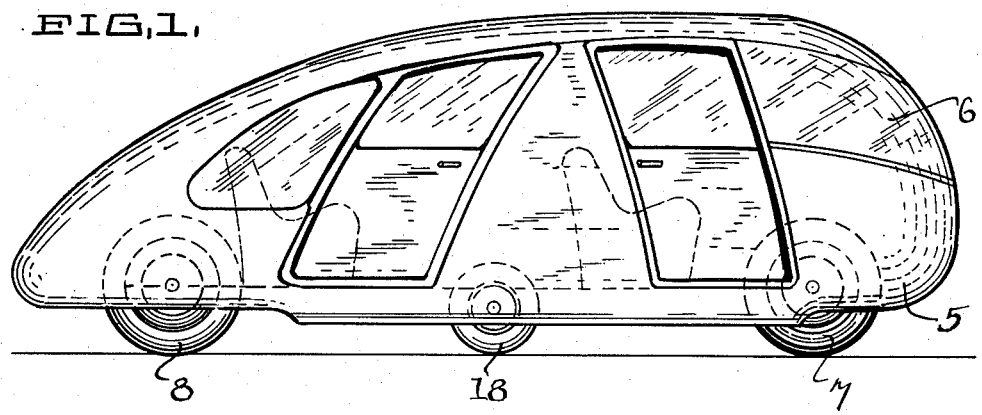
Figure 2:
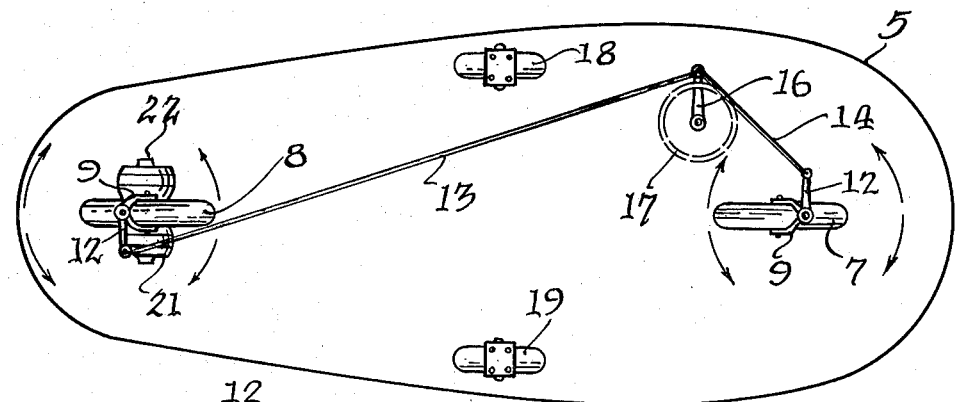
Fig. 2 is a top plan view thereof.
Figure 3:
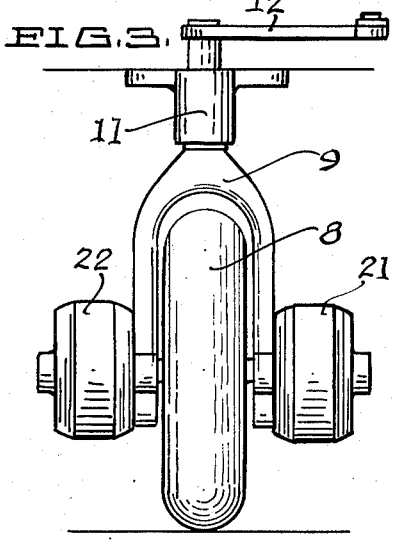
Fig. 3 is a front elevation of one of the steering wheels; for instance, the rear steering wheel.
Figure 4:
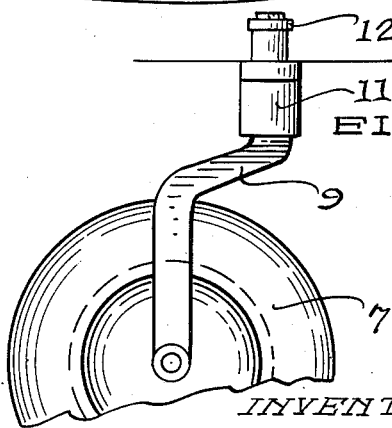
Fig. 4 is a side elevation of the front steering wheel.

In the accompanying drawing wherein for the purpose of illustration is shown a preferred embodiment of my invention, the numeral 5 designates the body portion of the vehicle which I have preferred to show as streamline and having a window 6 through which full observation of the road ahead may be readily observed. Mounted beneath the vehicle and in front thereof is a steering wheel 7 and at 8 I have shown a similar steering wheel mounted near the rear of the vehicle. These wheels are in alignment with each other and in the plane passing vertically through the center of the vehicle and from end to end thereof. These wheels 7, 8 are each mounted in an offset yoke such as shown at 9 in Figs. 3 and 4, which yokes are pivotally mounted in brackets 11 and are offset as best illustrated in Fig. 4. Wheels 7 and 8, which are mounted in offset yokes 9, are shifted, in turning, to the side opposite the direction in which the vehicle is turning. The shifting of the steering wheels from the center line of the vehicle to either side of the center line is in direct proportion to the radius of the turn. The rear wheel 8 steers simultaneously with the front wheel 7 but in the opposite direction. Both front and rear wheels shift to the same side of the vehicle in turning due to the mounting of offset yokes 9, as illustrated in Fig. 2. It is to be understood that the front wheel 7 and the rear wheel 8 contact the ground more forcibly at all times than do the stabilizer wheels. The crank arm 12 permits pull rods 13 and 14 extending from each crank arm to be connected to a steering lever 16 which is actuated by a steering wheel 17 of customary construction and positioned within the vehicle. Stabilizer wheels are shown at 18 and 19, which stabilizer wheels are located adjacent the outer edges of the vehicle and substantially midway between the pivotal points of yokes 9. The stabilizer wheels are constructed so as to allow a reasonable tilt of the entire vehicle with no appreciable resistance. They are also constructed so as to offer greater resistance in direct proportion to the tilting angle of the vehicle, this being incorporated in the construction as a safety feature so as to make it impossible for the vehicle to turn over. Power may be applied to either of the wheels 7 or 8, and in the present instance I have shown diagrammatically motors 21 and 22 secured to the rear yoke 5 and capable of rotating the wheel 8.

As a result of this construction when the vehicle moves straight ahead the front and rear wheels are in alignment. When making a left turn the front steering wheel 7 is turned left but the offset causes the wheel to shift from the center line of the vehicle to the right side which automatically shifts the weight of the vehicle to the left side, and the vehicle tends to lean in the direction in which it is turning which is a desirable result.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, the combination with a vehicle body, a pair of centrally disposed aligned wheels mounted beneath said body and in the same plane as the vertical, longitudinal, medial plane of the vehicle, each of said wheels being carried in an offset yoke, means for steering said vehicle including pull rods connected between said yokes and a steering wheel, and stabilizer wheels mounted parallel to each other at a point substantially midway between said first mentioned wheels and at points adjacent the margin of said vehicle.

2. In a vehicle of the character described, the combination with the body having a pair of centrally disposed aligned wheels mounted beneath said body and in the same plane as the vertical, longitudinal, medial plane of the vehicle, each of said wheels being carried in an offset yoke adapted to cause the center of gravity of said vehicle to be shifted to the same side as the direction in which the vehicle is turned, means for steering said vehicle including pull rods connected between said yokes and a steering wheel, and stabilizer wheels mounted parallel to each other at a point substantially midway between said first-mentioned wheels and at points adjacent the margin of said vehicle.

STANLEY S. MASSEY.